United States Patent [19]

Rogers

[11] 4,353,225
[45] Oct. 12, 1982

[54] JEWELRY FOR ANIMALS

[76] Inventor: Wanda S. Rogers, 1210 Luttrell St., Knoxville, Tenn.

[21] Appl. No.: 90,463

[22] Filed: Nov. 1, 1979

[51] Int. Cl.³ .............................................. A44C 7/00
[52] U.S. Cl. ......................................... 63/13; 40/301; 119/96; 63/29 R
[58] Field of Search ................ 63/12, 13; 119/1, 135, 119/156, 96; 151/7; 40/301

[56] References Cited

U.S. PATENT DOCUMENTS

| | | | |
|---|---|---|---|
| 263,755 | 9/1882 | Braverman | 63/12 |
| 799,056 | 9/1905 | Huber et al. | 63/13 |
| 2,428,645 | 10/1947 | Bausch | 151/7 X |
| 2,462,603 | 2/1949 | Boots | 151/7 X |
| 3,942,480 | 3/1976 | Hair | 119/156 |
| 3,945,089 | 3/1976 | Gagnon | 63/12 X |
| 4,089,189 | 5/1978 | Verducci | 63/12 X |
| 4,184,453 | 1/1980 | Ritchey | 40/301 |

*Primary Examiner*—F. Barry Shay
*Attorney, Agent, or Firm*—Pitts & Kesterson

[57] ABSTRACT

Decorative devices for pierced ears having two decorative sides and interchangable "add on" decorative parts is disclosed. The decorative ear devices "or earrings" of this invention are primarily for use for "show" animals such as dogs, cats and horses, but could also be used by humans. The "earrings" of this invention are for use for pierced ears and comprise a first decorative end having a permanently attached shaft. A first protective washer fits over the shaft and against the first decorative end. The shaft is made of a material suitable for passing through a pierced ear of an animal, such as for example, a poodle and preferably includes a male thread on the end thereof. A second protective washer is placed around the shaft after it is passed through the pierced ear. A second decorative end is secured to the end of the shaft, thereby also securing the earring to the pierced ear. For an earring having a threaded shaft, the second decorative end includes a snug fitting female thread. Either one or both of the two decorative ends further include means for attaching additional decorative parts such that the earrings may be selectively changed from a basic earring having two simple decorative ends for every day wear to an earring having elaborate decorative ends for an animal ready for a show.

10 Claims, 13 Drawing Figures

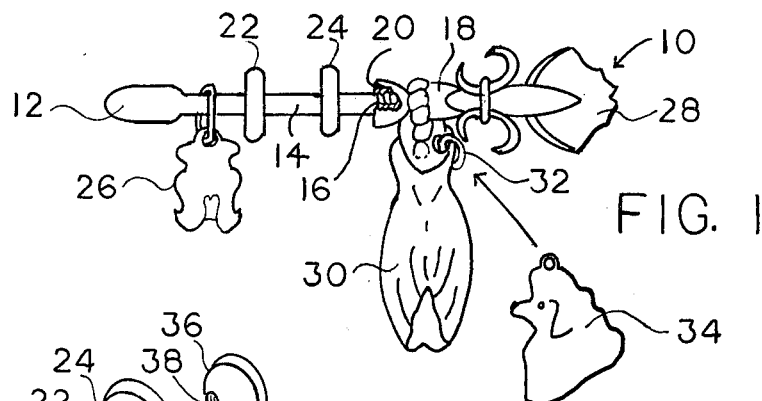
FIG. 1
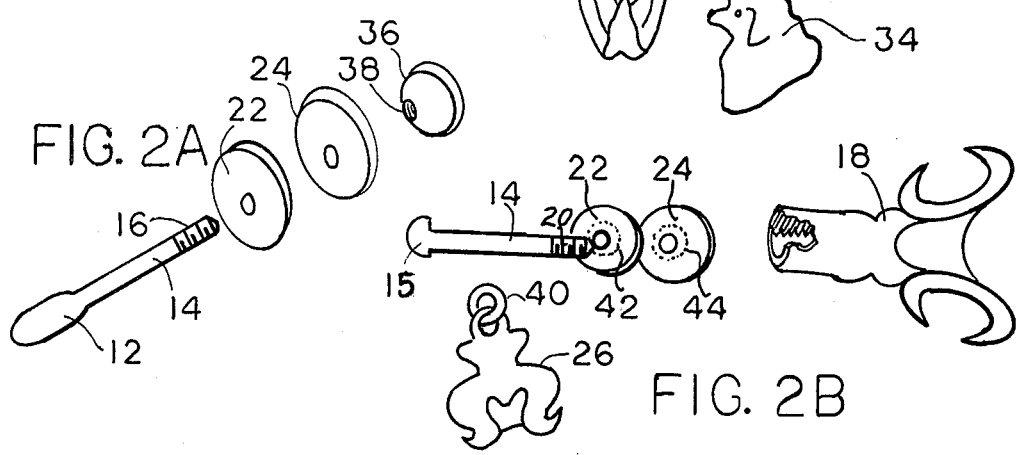
FIG. 2A
FIG. 2B
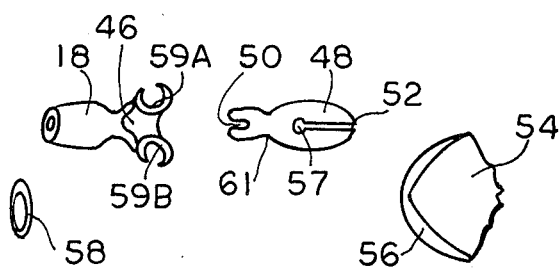
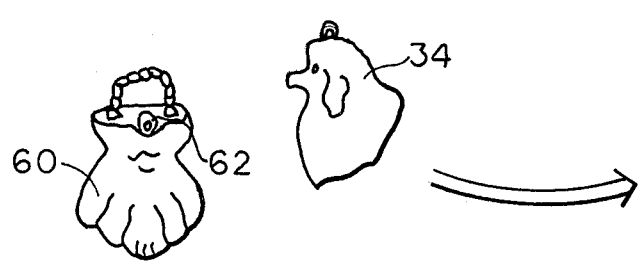
FIG. 3A
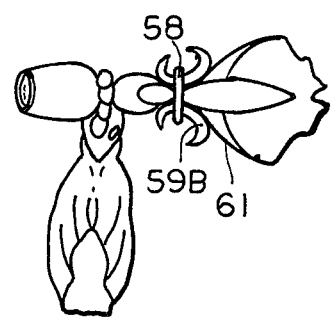
FIG. 3B

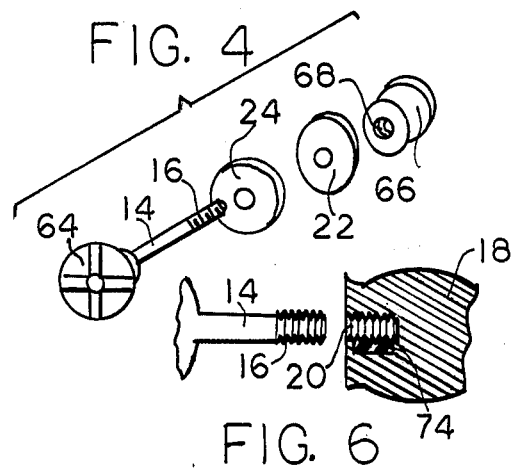
FIG. 4
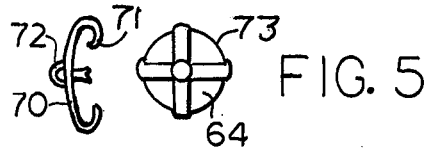
FIG. 5
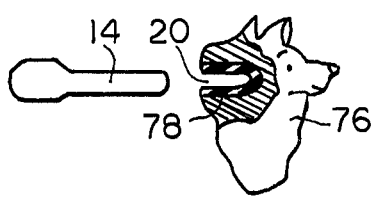
FIG. 7
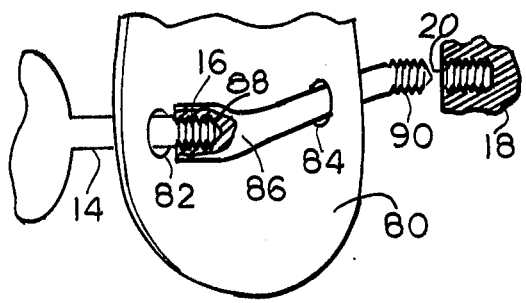
FIG. 6
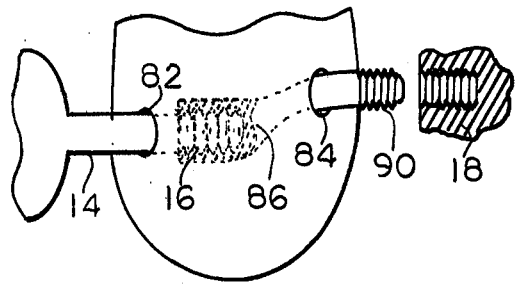
FIG. 8A
FIG. 8B
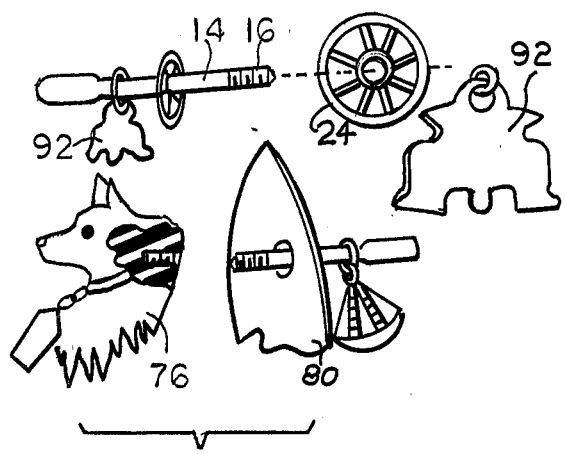
FIG. 9A
FIG. 9B

JEWELRY FOR ANIMALS

BACKGROUND OF THE INVENTION

This invention relates generally to decorative devices for pierced ears or "earrings" and more particularly to earrings having two decorative ends which can be progressively "added to" such that the basic earring may serve as a simple earring suitable for wearing everyday to an extremely elaborate earring for short term wear for a show or formal wear. The earrings are particularly useful for show animals such as dogs, cats, horses and include means to protect the animals ear from irritations due to excessive scratching or rubbing.

The decorative add on portions of the earrings are preferably designed to identify and be associated with a particular animal wearing the earrings. For example, an earring particularly suitable for a French poodle can be built up and added to, to provide the appearance of an elaborate French key with a fleur de lis, etc., and the facsimile of a head of a french poodle.

It is, of course, common knowledge that decorations for various parts of the body including the ear have been used in all cultures from the earliest and most primitive to the most cosmopolitan of today. Such decorations have been used for both humans as well as different domestic animals. Although several methods of attaching decorations to the ear have been used, one of the oldest and still most commonly used is to pierce the ears and pass a portion of the decorative device through the ear. For example, an investigation of the available references relative to the field of earrings revealed two recent patents that have issued in this field. One reference, U.S. Pat. No. 3,945,089 and issued to Kenneth M. Gagnon on Mar. 23, 1976, describes a two part securing device, one part having a stud extending therefrom and a second part having a clutch means with a central opening in the clutch means into which the stud may be passed and gripped. The clutch means inside the second part is a resilient member molded from nylon, rubber or a synthetic rubber, and has a cylindrical aperture therein with a diameter smaller than the diameter of the stud secured to the other decorative end. It will become clear hereinafter, this securing device when used for earrings is suitable for use with humans but would not be suitable for use with animals such as dogs, cats, horses and the like due to excessive rubbing or scratching by such animals.

U.S. Pat. No. 4,148,199 issued to John D. Boykin on Apr. 10, 1979, discloses a specific design of an earring comprising two portions. Each of said two portions being made of a clear material which defines a hollow and which is in the shape of a dog bone. The hollow ends are then filled with a specific colored liquid. One side of the decorative bone earring has a shaft which is passed through the pierced ear. The shaft itself includes a threaded recess. The other end of the bone includes a threaded rod suitable for screwing into the threaded recess of the shaft to secure the two sections of the decorative together. The specific decorative earrings described in this device is suitable for human use, but as will become clear hereinafter would not be suitable for animals due to excessive scratching or rubbing of the animal.

Therefore, it should be clear that the above discussed patents as well as any other available prior art is not particularly relevant to the present invention, as these devices are not suitable for use by animals which might tend to scratch or rub the earring. In addition the prior art earrings do not lend themselves to be changed in appearance. Therefore, to change the appearance of a typical earring requires removal of the earring and replacement with a new and differently decorated earring.

SUMMARY OF THE INVENTION

Therefore, it is an object of this invention to provide ear decorations suitable for use with show animals such as dogs, cats and horses.

It is another object of the present invention to provide decorations suitable for use with pierced ears of animals, which decorations have protection means for protecting the animals ear from irritation due to scratching rubbing, etc.

It is still another object of this invention to provide ear ornamentation which can be changed from very simple to very elaborate.

It is yet another object of this invention to provide ear ornamentation, which ornamentation can be changed without removing the earring from the pierced ear.

It is still another object of this invention to provide ear ornamentation for use with an animal which ornamentation is not subject to accidental removal by scratching or rubbing.

It is yet another object of this invention to provide ear ornamentation for use with an animal which ornamentation is distinctive to the animal wearing the earring.

These and other objects which will become clear hereinafter are achieved by earrings fabricated according to this invention comprising:

a first member having a selected decorative appearance which has attached thereto an elongated shaft. The elongated shaft is attached to the first member at one of its ends and has a diameter of a selected size. A second member which is also of a selected decorative pattern includes an elongated recess which is suitable for receiving the further end portion of the elongated shaft. For example, in one embodiment the further end of the elongated shaft includes male threads and the elongated recess includes female threads. The apparatus further includes protective means such as a pair of shields, each of said shields define an aperture having an outside diameter which is substantially the same as the selected diameter of the shaft, and which fits snugly around the elongated shaft between the two decorative members. Thus, when the decorative ear piece is in place on a wearer, the wearer's ear is protected from the decorative end pieces by the protective means. In the case of a threaded shaft and an elongated recess, it will be appreciated that the decorative end having a recess is screwed snugly onto the threaded shaft. According to the preferred embodiment of this invention, the two decorative ends may both or singly be suitable for receiving additional decorative attachments such that the ear decorating device may progressively be changed from a very simple decoration to a very elaborate decoration. According to one specific embodiment, the ear decorating device includes an additional attachment having the appearance of the flutes of a key for attaching at one of the two decorative ends, and also includes the finger-hold portion of a decorative key such that the overall appearance when placed on a wearer is that of a decorative french key passing through the ear of the wearer.

BRIEF DESCRIPTION OF THE DRAWINGS

FIG. 1 shows an earring incorporating the features of this invention which earring has additional decorative portions attached thereto such that it has the appearance of an elaborate french key.

FIGS. 2A and 2B illustrate the protective means and the addition of decorative portions to the basic earring of this invention to obtain an earring having an overall appearance more elaborate than that shown in FIG. 2A but less elaborate than that shown in FIG. 1.

FIGS. 3A and 3B show other additional decorative portion that may be added to the earring of FIG. 2B to obtain the elaborate decorative earring of FIG. 1.

FIG. 4 shows an alternate decorative design of an earring incorporating the features of this invention which decorative design is that of a porcelain drawer pull.

FIG. 5 shows another decoration which can be added to the earring of FIG. 4 which has means for attaching additional decorative portions.

FIGS. 6 and 7 show cross sectional views of how two decorative portions making up the present earring can be snuggly secured and attached.

FIGS. 8A and 8B shows an embodiment of this invention which includes a flexible member so that the earrings can be used on an ear which is pierced in two locations.

FIGS. 9A and 9B show additional decorative attachments for the basic earring of FIG. 2A including facsimiles of the head of specific types of animals.

DETAILED DESCRIPTION OF THE INVENTION

Referring now to FIG. 1, there is shown generally at 10 an earring which incorporates the teachings of this invention and which is of an elaborate design. As is seen, the earring includes a first decorative member 12 to which is permanently attached a shaft 14. In the embodiment shown, shaft 14 includes at the end which is not attached to decorative end 12 a threaded portion 16. A second decorative member 18 includes an elongated recess 20 having threads suitable for receiving the threaded portion 16 of shaft 14. A protective means comprising two protective shields 22 and 24 are shown mounted on shaft 14. Also shown in this particular embodiment are the flutes 26 of an elaborate french key along with other decorative portions which form the finger-hold 28 of the french key and having a fleur de lis design. The earring can be made even more elaborate by including a lock 30 having the shape of a scallop which in turn includes means 32 suitable for attaching a facsimile of the head of a french poodle or other animal 34. Thus, as has been described, FIG. 1 illustrates a very elaborate earring incorporating the features of this invention.

Referring to FIGS. 2A, 2B, 3A, and 3B, in succession, there will be described techniques by which the earrings of this invention may progressively be changed from having the appearance of a very simple earring to a very elaborate earring such as shown in FIG. 1. As shown in FIG. 2A, there is a decorative member 12 to which is attached the shaft 14 and which has the threaded end 16. Also included are the two protective shields 22 and 24 which fit on each side of the ear through which shaft 14 is passed. FIG. 2A also shows a second decorative member 36 which includes a threaded elongated recess 38. It will be appreciated, that the second decorative member 36 could be a rather plain member as shown in FIG. 2A, or could be the decorative piece 18 such as shown in FIG. 1 and FIG. 2B.

A earring somewhat more decorative than that shown in 2A can be achieved by the addition of other decorative members as is illustrated in FIG. 2B. As shown in FIG. 2B, the key flutes 26 may be attached to shaft 14 by means of ring 40. Ring 40 simply passes over shaft 14 until it is against decorative end 15 which is shown as being different than decorative end 12 of FIG. 2A. Protective shields 22 and 24 are used in the manner heretofore described, that is, on each side of the ear of the wearer. Decorative member 18 is then screwed on the threaded shaft portion 20 of shaft 14. As shown in the drawings, protective shields 22 and 24 may be washer shaped as shown or any other desirable shape. As is shown in the Figures these shields preferably include a resilient insert such as shown at 42 and 44. The resilient insert may be made of a synthetic rubber or nylon or any other material so that when the protective shields are passed on shaft 14, they fit snugly thereon.

Protective shields 22 and 24 are believed to be of great importance for use with earrings placed on animals such as dogs, cats or horses to avoid irritation and injury to the animals due to the excessive rubbing or scratching.

Referring now to FIGS. 3A and 3B there is shown how an additional decorative item may be attached to the earring of FIG. 2B to achieve the final overall elaborate earring of FIG. 1. As shown, the decorative end 18 includes a recess 46 suitable for receiving the arrow shaped portion 48 having two slots 50 and 52. Slot 52 is suitable for receiving the fan shaped member 54 which includes a rim 56 suitable for snapping into the enlarged portion 57 of slot 52. Ring 58 may be included to provide additional decorative effect but also provides additional means to help secure the arrow pointed member 48 to decorative member 18 by snapping ring 58 into indentations 59A and 59B of member 18 and around groove 61 of arrow shaped portion 48 as is clearly shown in FIG. 3B. If desired, an even further decorative item 60 may be passed over the portion of decorative member 18 as shown in FIG. 3B. Item 60 as shown in these drawings represent a lock having the shape of a scallop. Scallop shaped lock 60 may include a ring means 62 to which a facsimile 34 of an animal such as a poodle may be attached. FIG. 3B shows the components of FIG. 3A in their combined state without facsimile 34. It can be seen that there has been described an earring having the capability of having its appearance altered from that of a very simple earring to a extremely elaborate earring. Referring now to FIG. 4 there is shown an alternate embodiment of an earring incorporating the features of this invention which has a different decorative design. This decorative design, however, also includes a technique for providing for the addition of other decorative attachments. As shown in FIG. 4, a first decorative member 64 has permanently attached thereto a shaft 14 which includes a threaded end portion 16. A second decorative end 66 having a threaded elongated recess 68 suitable for mating with the threaded portion 16 of shaft 14 is provided. Also provided are two protective shields 22 and 24 as discussed hereinabove. As illustrated, the decorative portion of this earring has the appearance of porcelain drawer pulls.

However, referring to FIG. 5 there is shown a decorative member 64 to which means 70 is added for providing attaching ring 72 which is suitable for receiving other decorative attachments. As shown, means 70 is simply snapped into position around member 64, such that hooked end 71 fit around edge 73 of member 64.

Regardless of the decorative design selected for earrings incorporating the features of this invention, it will be appreciated that it is of upmost importance that shaft 14 and protective shields 22 and 24 be made of a material such as stainless steel, gold, non-allergenic plastics or the like to avoid the possibility of infection or irritation to the pierced ear. It will also be appreciated that although shaft 14 may be made of a metal which would be heavy, it is extremely desirable that the additional decorative attachments be made as light weight as possible to avoid inflicting pain to the sensitive ears of the wearer of the earrings. Thus, it will be appreciated that decorative attachments are preferably made of light weight nylon or plastic which may be of any selected color.

Heretofore, alternate embodiments of the earrings incorporating the feature of this invention have been discussed as having a threaded portion 16 on shaft 14. This threaded portion is received by an elongated threaded recess in the decorative member 18. However, according to one preferred embodiment of this invention the threaded recess 20 in decorative end 18 further includes a resilient member 74 to make up a portion of the threaded recess. When the decorative end 18 is screwed on to threaded portions 16 it will be appreciated that the resilient member 74 provides a snug fit between the threaded portion 16 and decorative end 18 such that decorative end 18 will not tend to unscrew from the shaft 14. With respect to animals such as dogs and cats this is very important as otherwise these animals might tend to loosen the earring by means of scratching and/or rubbing. Resilient member 74 may suitably be selected from nylon synthetic rubber or other materials.

Referring now to FIG. 7, there is shown an alternate embodiment for joining shaft 14 with the second decorative member 76. In the embodiment shown in FIG. 7, it will be shown that there is no threaded end portion. Shaft 14 as shown in FIG. 7 is smooth from end to end. However, as is shown, decorative member 76 includes a resilient member 78 embedded in the material thereof. Elongated recess 20 also, of course, does not include any matching threads. However, as can be seen, recess 20 is located within resilient member 78 and the diameter of recess 78 is less than that the of the shaft 14. Thus, it will be appreciated that when shaft 14 is pushed into the recess 20, resilient member 28 will grasp shaft 14 and prevent it from being removed.

Referring now to FIGS. 8A and 8B there is shown another embodiment of the present invention. According to this embodiment, the receiving ear 80 of an animal such as a poodle is pierced at two locations or aperatures 82 and 84. Shaft 14 is passed through aperature 82. A flexible extension member 86 which is preferably made out of a material such as nylon and which has female threads 88 suitable for cooperating with male threads 16 on shaft 14. The other end of flexible shaft 86 includes male threads 90 suitable for cooperating with female threads 20 in decorative end 18. Although the embodiment of FIGS. 8A and 8B is suitable for use with any of the decorative earring embodiments of this invention and is suitable for use with any type of dog, the concept is especially attrative for use as a single earring on only one ear of the animal. For example, use with a male poodle is particularly suitable.

FIGS. 9A and 9B are provided to show other decorative embodiments for the present invention. For example, different arrangement of flutes for the key may be provided as is shown at 92, or decorative attachments may include a front half of a ship at one end and a rear half of a ship at a second end. Still another embodiment, includes the use of a facsimile of the head of the animal selected to wear the device.

Although there has been described what is considered to be the preferred embodiments of this invention, it will be obvious to those skilled in the art that various changes and modifications may be made therein without imparting from the invention and this application is therefore intended to cover all such changes and modifications as fall within the true scope and spirit of the invention.

What is claimed is:

1. An ear decoration suitable for use with pierced ears of a domestic animal and for providing protection against irritation due to scratching and rubbing comprising:

a first member having a decorative portion;

an elongated shaft of a selected diameter having a first and further end, said first end permanently attached to said first member;

an extension member having a diameter substantially the same as said selected diameter and a receiving end and a projection end, said receiving end including a first elongated recess for receiving said further end of said elongated shaft;

a second member having a decorative portion and including a second elongated recess for receiving said projection end of said extension member; and first and second protective means, each of said protective means defining an aperture having a diameter substantially the same size as said selected diameter, said first protective means for fitting snugly around said elongated shaft and between said decorative portion of said first member and said animal's ear, and said second protective means for fitting snugly around said extension member and between said animal's ear and said decorative portion of said second member such that when said elongated shaft and said extension member are passes through the pierced ear of said animal, said protective means provides protection against irritation of the animal's ear by scratching and rubbing.

2. The ear decoration of claim 1 wherein said further end of said elongated shaft and said projection end include threads, and said first and second elongated recesses include threads suitable for cooperating with said threads.

3. The ear decorating device of claim 2 and further including resilient inserts comprising a part of said first and second threaded recesses to provide a tight and secure fit when secured on said threads.

4. The ear decoration of claim 1 wherein said second member and said receiving end of said extension member comprise a rigid external portion and a resilient internal portion, said first and second elongated recesses being located in said resilient internal portions and having a diameter less than said selected diameter.

5. The ear decorating device of claim 1 wherein at least one of said protective shields includes a resilient insert at its central portion, and said defined aperture is in said resilient insert.

6. The ear decorating device of claims 1, 2, 3 or 4 wherein the decorative portion of at least one of said first and second members is suitable for receiving additional decorative attachments.

7. The ear decorative device of claim 1 wherein said first member is suitable for receiving a decorative attachment having an appearance of the flutes of a key and said second member is suitable for receiving a decorative attachment having the appearance of the fingerhold of a key such that when said ear decoration is in place on a wearer the overall appearance is of a decorative french key passing through the ear of said animal.

8. The ear decorative device of claim 1 wherein one of said first and second members if suitable for receiving a decorative attachment having the appearance of the front half of a sailing vessel and the other of said first and second member is suitable for receiving a decorative attachment having the appearance of the back half of a sailing vessel.

9. The ear decorative device of claim 1 wherein said additional decorative attachment is a facsimile of the head of the animal.

10. The ear decorating device of claim 1 wherein said elongated shaft, said extension member and said protective means are made of a non-irritating and non-allergenic material.

* * * * *